(12) United States Patent
Paluncic et al.

(10) Patent No.: US 8,136,634 B2
(45) Date of Patent: Mar. 20, 2012

(54) PISTON ARRANGEMENT

(75) Inventors: Zdravko Paluncic, Ludwigshafen (DE); Ralf Trinkel, Gerolsheim (DE)

(73) Assignee: Lincoln GmbH, Walldorf (DE)

( * ) Notice: Subject to any disclaimer, the term of this patent is extended or adjusted under 35 U.S.C. 154(b) by 880 days.

(21) Appl. No.: 12/091,842

(22) PCT Filed: Sep. 26, 2006

(86) PCT No.: PCT/EP2006/008446
§ 371 (c)(1), (2), (4) Date: Aug. 22, 2008

(87) PCT Pub. No.: WO2007/048460
PCT Pub. Date: May 3, 2007

(65) Prior Publication Data
US 2009/0193965 A1 Aug. 6, 2009

(30) Foreign Application Priority Data

Oct. 28, 2005 (DE) .................... 20 2005 017 065 U

(51) Int. Cl.
*F16N 7/16* (2006.01)
(52) U.S. Cl. ............................ 184/7.4; 184/39.1; 91/224
(58) Field of Classification Search ............. 91/224, 91/229; 184/7.4, 39.1
See application file for complete search history.

(56) References Cited

U.S. PATENT DOCUMENTS

| 2,000,925 | A | * | 5/1935 | Cowles | ............................ 184/7.4 |
| 3,233,628 | A | * | 2/1966 | Hammelmann | ................. 91/229 |
| 3,581,845 | A |   | 6/1971 | Nederynen | |
| 3,587,782 | A |   | 6/1971 | Russell et al. | |
| 3,715,013 | A |   | 2/1973 | Lyth | |
| 3,958,725 | A |   | 5/1976 | Reeve | |
| 4,096,747 | A | * | 6/1978 | Gilson | ............................ 91/224 |
| 2004/0211628 | A1 |  | 10/2004 | Kojima | |

FOREIGN PATENT DOCUMENTS

| DE | 2009921 | 3/1969 |
| DE | 2010730 | 3/1969 |
| EP | 1471301 A2 | 10/2004 |

\* cited by examiner

*Primary Examiner* — Daniel Lopez
(74) *Attorney, Agent, or Firm* — Senniger Powers LLP

(57) ABSTRACT

A piston arrangement is disclosed for metering valves, flow-rate sensors or hydraulic motors. The piston arrangement comprises a housing, at least one recess in the housing, and a first piston sealed and movable in the at least one recess of the housing. A recess is provided in the first piston, and a flow passage extends through the first piston. A second piston is movable in the recess of the first piston. A sealing surface is provided on the second piston, and a valve seat is provided on the first piston against which the sealing surface on the second piston can be pressed in such a way that the second piston can be moved in the first piston between a position which opens the flow passage through the first piston and a position which shuts off the flow passage through the first piston.

16 Claims, 5 Drawing Sheets

PISTON ARRANGEMENT

BACKGROUND OF THE INVENTION

The invention relates to a piston arrangement, with which, for example, a metering valve, a flow-rate sensor, or a hydraulic motor can be implemented.

For such applications, it is frequently necessary, in the first place, to provide a metering piston, which is suitable for conducting a defined quantity of fluid, and a reversing piston, which creates the back-and-forth movement of the metering piston. In particular, for the use of such a piston arrangement for lubricating devices, which are operated partially at very low temperatures, e.g., at −40° C., a piston arrangement should not only be as simple and compact in construction as possible, but also have long-term operating reliability.

SUMMARY OF THE INVENTION

In general, a piston arrangement of this invention is provided for metering valves, flow-rate sensors, or hydraulic motors. The piston arrangement comprises a housing, at least one recess in the housing, and a first piston sealed and movable in the at least one recess of the housing. A recess is provided in the first piston, and a flow passage extends through the first piston. A second piston is movable in the recess of the first piston. A sealing surface is provided on the second piston, and a valve seat is provided on the first piston against which the sealing surface on the second piston can be pressed in such a way that the second piston can be moved in the first piston between a position which opens the flow passage through the first piston and a position which shuts off the flow passage through the first piston.

DETAILED DESCRIPTION

Figure 1:
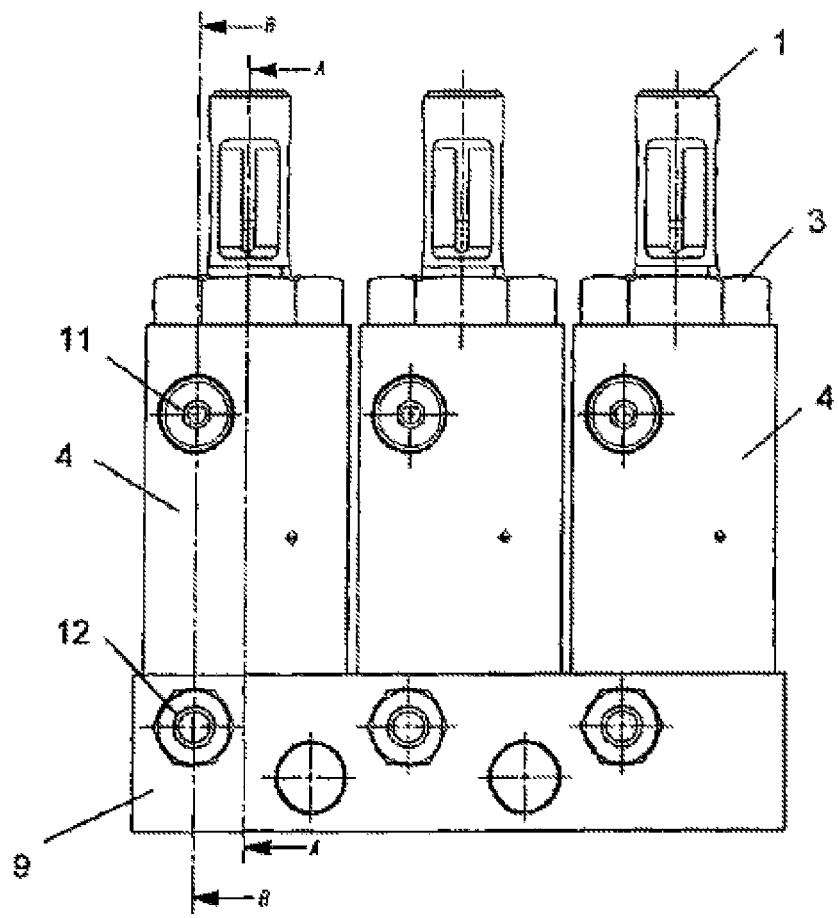
FIG. 1 is a top view of three metering valves according to the invention, which are arranged on a common manifold.
Figure 2:
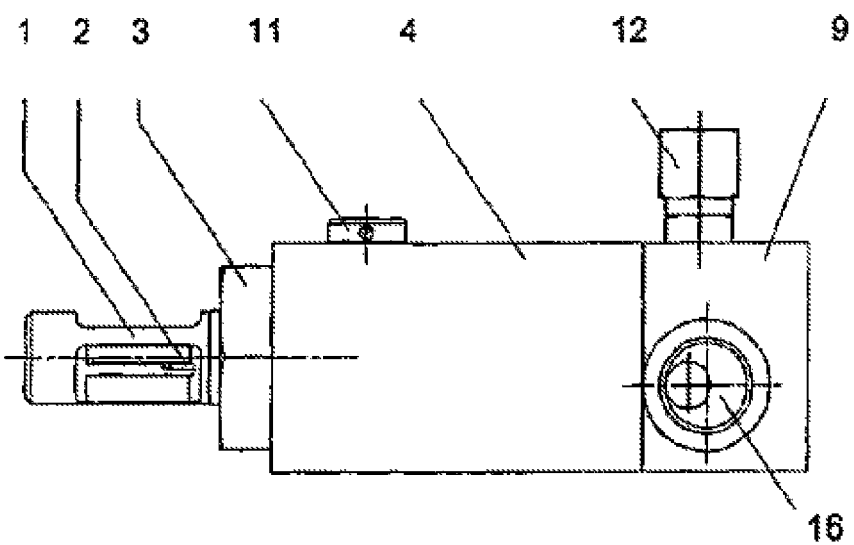
FIG. 2 is a metering valve according to FIG. 1 with manifold in side view.

The metering valves or injectors shown in FIGS. 1 to 4 each consist of an injector body or housing 4, wherein, in the shown embodiment, three injector bodies 4 are mounted on a common manifold 9 each with two cylinder head screws 10. The seal between the injector bodies 4 and the manifold 9 is realized by means of O-rings, as is visible from the section view of FIGS. 3 and 4. The assembly of the complete manifold, which consists of the manifold and the injectors, can be realized, for example, by means of two attachment boreholes located in the manifold 9.

The supply of lubricant to the distributor unit is delivered by a feed line 16 formed as a passage borehole in the manifold 9 with lateral connection threads for threaded connections for connecting the pump line or additional manifolds. In addition, the outlets of the individual injectors are fed back into the manifold 9 and can be connected by means of straight (or angled) threaded connections 12 to lubricant lines, which lead, for example, to a bearing point.

Each individual injector (metering valve) is made from the injector body 4 (housing) in which a cylindrical recess is formed. A first (injector) piston 8 is movable back and forth in this recess. An injector closure screw 3 closes the recess on the top side of the injector body 4 in FIGS. 1 and 3 and represents a stroke limitation for the injector piston assembly. An adjustment element 1 is threaded in the closure screw 3 and provides means by which the dosed quantity of the injector can be adjusted. For visual inspection of the injector function, a view window is provided in the adjustment element 1 through which an indicator pin 2 is to be seen. The indicator pin 2 is connected to the first piston 8 and moves up and down with this piston during a lubricant cycle.

The injector piston 8 defines, in the injector body 4, a first chamber 14, which faces the manifold 9, and a second chamber 15 turned away from this manifold. The first chamber 14 is in flow connection with the supply line 16. The second chamber 15 is provided with a lateral output, which is closed in the illustrated embodiment with a closure screw 11. As can be seen from the illustration of FIG. 4, an outlet borehole 17, through which a lubricant is led to the threaded connection 12 in the manifold 9, branches away from the second chamber 15. In the connection borehole 17, a relief valve 13, which consists of a ball, a spring, and a spring holder, is provided in the illustrated embodiment.

Figure 3:
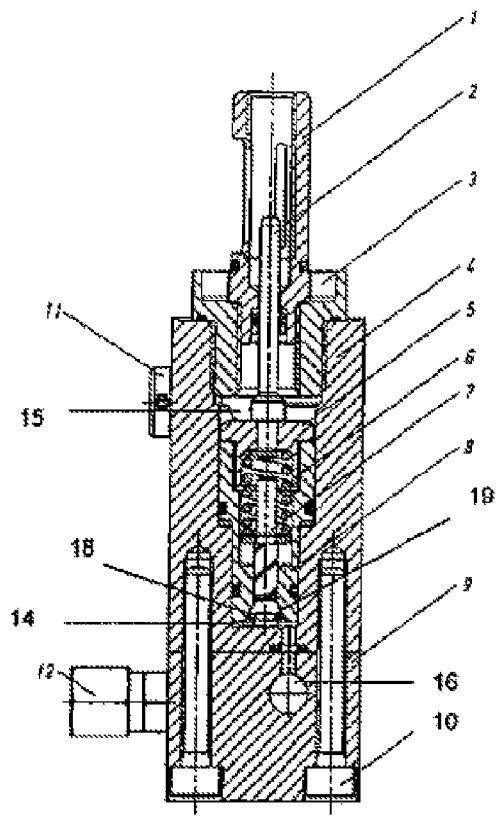
FIG. 3 is a section through a metering valve and the manifold along line A-A in FIG. 1.

A cylindrical recess is formed in the injector piston 8. A second piston 7 forming a control valve is movable back and forth in this recess. The lower end of the injector piston 8 in FIG. 3 is provided with a conical valve seat 18, while the lower end of the second piston 7 has a corresponding conical sealing surface 19 with a sealing ring. A cylindrical outer surface area of the second piston 7 is provided with a helical, curved groove, so that fluid can flow between the outer surface of the second piston 7 and the similarly cylindrical inner surface of the first piston 8 when the sealing surface 19 is raised from the valve seat 18.

An injector piston screw 5 closes the first piston 8 to the second chamber 15. A helical compression spring 6 mounted between the screw 5 and the second piston 7 applies a force on the second piston 7 urging it toward its opened position. Alternatively, a Belleville spring stack can be used instead of the helical compression spring. As can be seen from the diagram of FIG. 3, the combined surface area of the first piston 8 and the second piston 7 facing the first chamber 14 is smaller than the surface area of the injector piston screw 5 facing the second chamber 15.

In the following, the function of the metering valve according to the invention will be explained in more detail. The charge phase begins when, in the no-pressure state, the control valve 7 (second piston) is opened by the spring force of the helical compression spring 6 in the injector piston 8 (first piston). If grease is pumped into the first chamber 14 of the injector through the supply line 16 using a grease gun, for example, then the grease flows past the opened control valve 7 through the helical, curved groove and thus reaches the second chamber 15 through the injector piston 8. From this chamber, the grease flows further into the outlet borehole 17 up to the next closed relief valve 13. As further grease is delivered into the injector, the internal pressure increases, wherein, through the surface area differences on the injector piston 8, the piston 8 is shifted downward in FIG. 3 due to the resulting force. In this phase, the second chamber 15 is filled with grease. As the piston 8 continues to move down, the control valve 7 is closed by the mechanical stop on the borehole base in the injector body 4 (housing). The diagram of FIG. 3 shows the end of the charge phase, in which the control valve 7 is again closed.

In the subsequent dosing phase, when the grease gun delivers additional grease or the like into the injector, the pressure increases in the first chamber 14 and in relation to this also in the second chamber 15. If the pressure set at the relief valve 13 is exceeded in the second chamber 14 and thus also in the outlet borehole 17, then the relief valve 13 opens and the injector piston 8 can be pressed upward in FIG. 3 by the pressure in the first chamber 14. The grease in the second chamber 15 is then delivered through the outlet borehole 17 past the relief valve 13 to a bearing point or the like.

Through the stop on the injector closure screw 3, the stroke of the injector piston 8 and thus the dosed lubricant quantity is limited. If a smaller quantity of grease is needed, then an adjustment screw (not shown) can be adjusted continuously in the adjustment element 1, so that the indicator pin 2, which is connected to the injector piston 8, is mechanically stopped and in this way limits the stroke of piston 8.

The discharge (venting) phase follows the dosing phase, in order to start a new lubricant cycle with a charge phase. Here, the pressure in the supply line 16 must drop below the dimensioned discharge (venting) pressure of advantageously approximately 90 bar. When the pressure drops below the discharge (venting) pressure, the control valve 7 is opened by the force of the compression spring 6. The available pressure from the supply line 16 in the first chamber 14 immediately decreases in the second chamber 15 and causes a small downward movement of the injector piston 8. The discharge speed (venting time) of the main line is increased by the piston stroke, because grease is removed from the supply line 16 during this piston stroke. By removing grease, the residual pressure in the main line drops abruptly, which is very important, particularly for the use of an injector at very low temperatures of approximately −40° C. for example. Only when the pressure falls below the discharge (venting) pressure can another lubricant cycle take place. The faster this discharge (venting) pressure is reached, the quicker a new lubricant cycle can take place.

To increase the possible maximum output quantity of the injector, only the length of the injector body and that of the injector piston has to be increased. Consequently, a new design of the springs in use is not needed. Alternatively, it is also possible to connect several injectors one below the other by means of the lateral outputs provided with the closure screws 11. In this way, the output quantity per stroke and lubricant position can be increased, without having to use injectors with a greater maximum output quantity.

Figure 5:
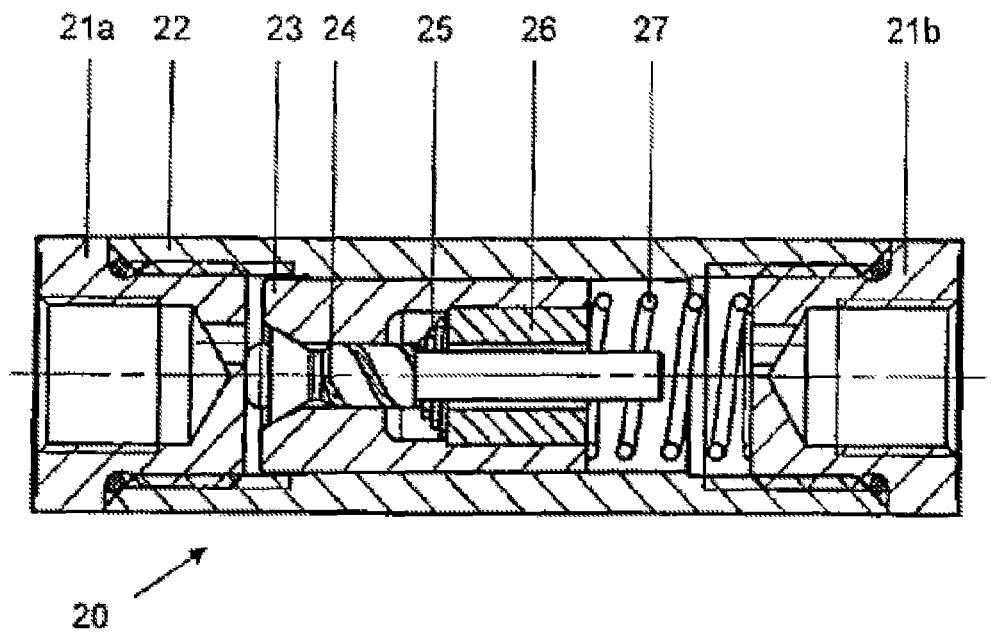
FIG. 5 is a flow-rate sensor according to the invention in sectional view.
Figure 6:
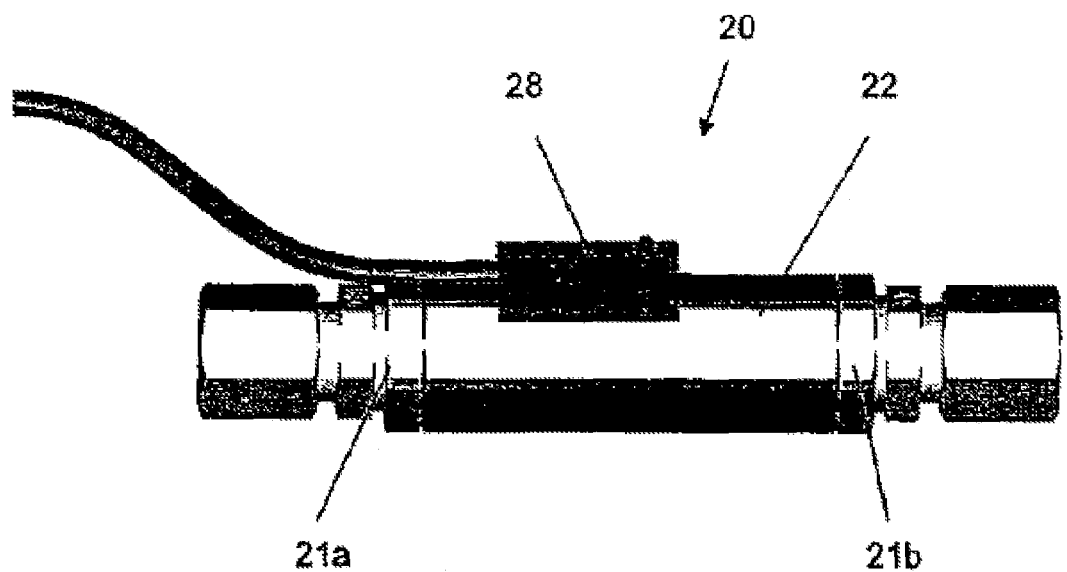
FIG. 6. is a top view of a flow-rate sensor according to FIG. 5.

The assembly and the function of a flow-rate sensor 20 according to the invention will now be described with reference to FIGS. 5 and 6. The flow-rate sensor 20 has an inlet opening 21a that can be integrated into a fluid line and an outlet opening 21b that can also be integrated into a fluid line. The inlet opening 21a and the outlet opening 21b close a tube-like sensor housing 22 and are sealed relative to this by means of O-rings. The inlet opening 21a and the outlet opening 21b are provided with internal threads, so that a straight threaded connection can be mounted in these openings. In the sensor housing 22, a first piston 23 (sensor piston) is guided in a movable way, so that two chambers are defined in the housing 22 by the sensor piston 23 between the inlet opening 21a and the outlet opening 21b.

In the sensor piston 23, a second piston 24 (sensor control valve) is guided in a movable way. A conical valve seat and a corresponding sealing surface are formed on the sensor piston 23 and the sensor control valve 24 as described above. Furthermore, the cylindrical outer surface of the second piston 24 is provided with a helical, curved groove, so that fluid can flow through this groove between the first and second pistons.

The second piston 24 is urged toward its open position (to the left in FIG. 5) by a conical compression spring 25 positioned between a shoulder on the second piston 24 and a ring magnet 26 held in the sensor piston 23. Furthermore, a compression spring 27 is provided between the sensor piston 23 and the outlet opening 21b for urging the sensor piston 23 toward the left in FIG. 5. An encapsulated circuit board with a Hall sensor 28, function LEDs, and a connection cable is located on the sensor housing 22.

The flow-rate sensor can be installed, for example, in the grease supply line of a lubrication point, in order to monitor the grease supply. In the rest position, the spring 27 presses the sensor piston assembly in FIG. 5 to the left in the direction of the inlet opening 21a until the sensor control valve 24 is closed by mechanical stop on the inlet opening 21a.

If grease or a fluid flows through the inlet opening 21a into the chamber on the left in the figure, then at first a pressure builds up in this chamber. If the pressure in this chamber rises so high that the resulting force acting on the sensor piston 23 is greater than the force acting on the outlet side, then the sensor piston assembly in FIG. 5 moves to the right in the direction of the outlet opening 21b. According to a defined piston path, the sensor control valve 24 (second piston) stops on a stop surface of the outlet opening 21b. In this embodiment, the sensor control valve 24 is opened by lifting the sealing surface from the valve seat, by means of which the inlet opening 21a is in flow connection with the outlet opening 21b.

Grease or the like flows in this position from the inlet opening 21a through the piston to the outlet opening 21b, so that the pressure difference in the chambers breaks down. The force of the compression spring 27 now restores the piston arrangement to the position shown in FIG. 5. Here, the sealing surface of the sensor control valve 24 is again pressed against the valve seat of the sensor piston 23, by which means the flow passage between the inlet opening 21a and the outlet opening 21b is shut off.

Flow through the flow-rate sensor according to the invention thereby causes an oscillating motion of the sensor piston 23 and the ring magnet 26 connected to this in the sensor housing 22. The movement of the magnetic field can be detected by the Hall sensor 28 and sent to a controller for evaluation. The switching of the Hall sensor 28 can be displayed visually by means of an LED. Another LED can give information on the operating state of the flow-rate sensor. In this way, it is possible, with the detected signal, to determine the run times or the output volume per unit time through a grease supply line.

Figure 4:
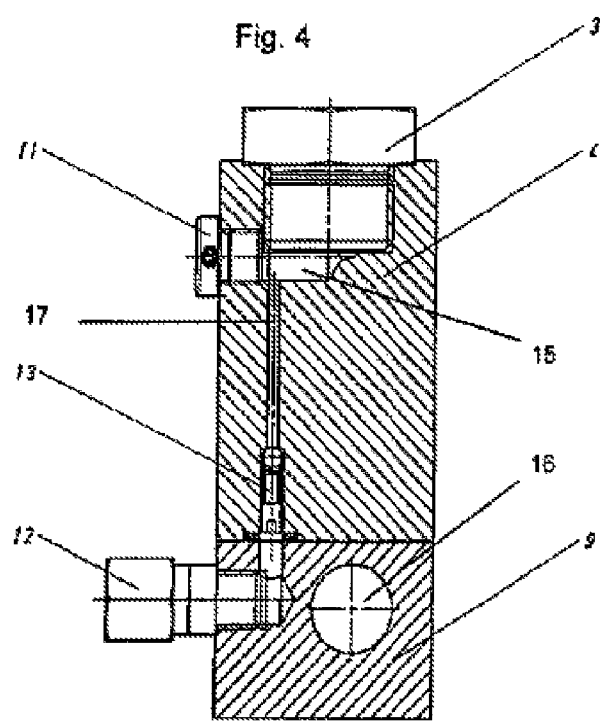
FIG. 4 is a section through a metering valve and the manifold along line B-B in FIG. 1.
Figure 7:
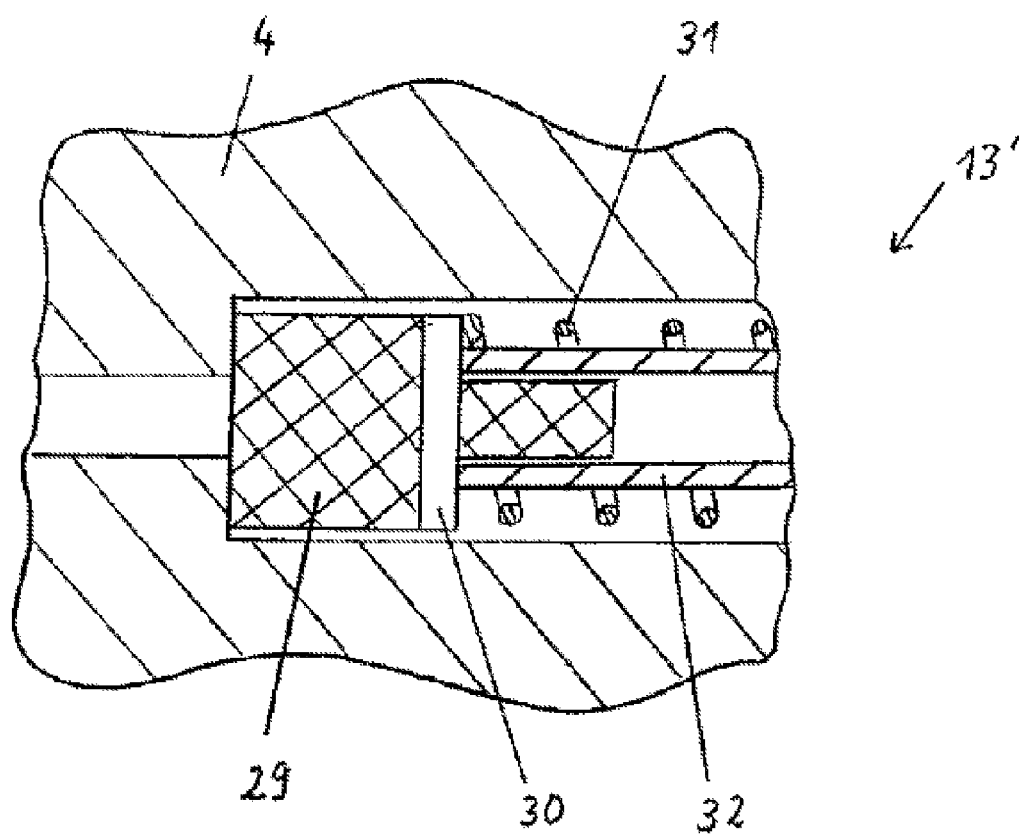
FIG. 7 is a section through a relief valve.
Figure 8:
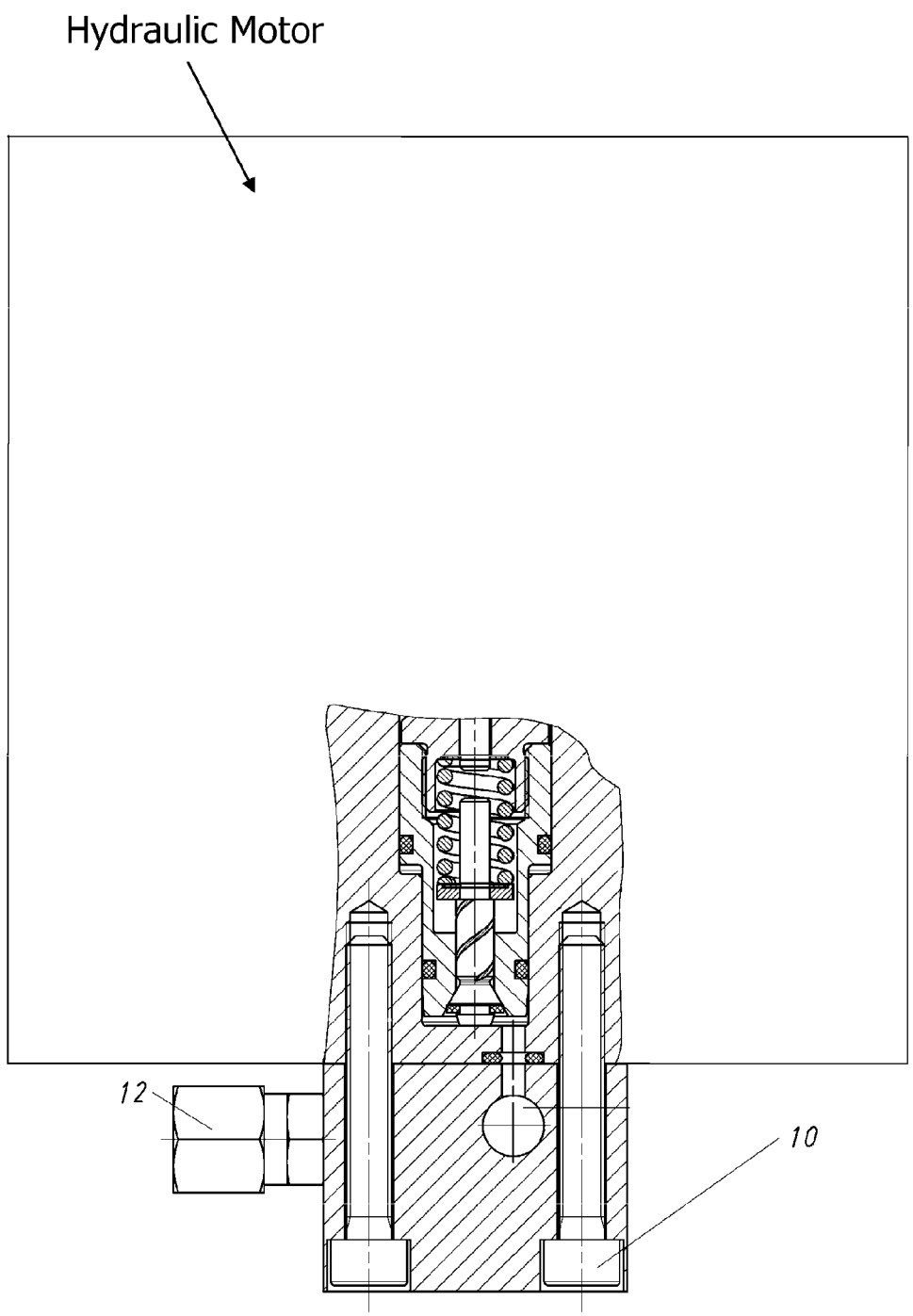
FIG. 8 is an enlarged fragmentary view of the metering valve and manifold in FIG. 3 shown schematically as part of a hydraulic motor.

In FIG. 7, a relief valve 13' with a sealing part 29 made from, e.g., PUR with a support disk 30 and a spring 31, is shown as an alternative to the relief valve 13 shown in FIG. 4. Here, a clamping sleeve 32 is used for limiting the stroke and protecting the spring 31 from overloading, because the block length 31 is not reached.

In view of the foregoing, it will be observed that a piston arrangement of this invention is not only simple and compact, it also has long-term operating reliability. As shown in the drawings and describe above, one embodiment of such an arrangement comprises a housing in which at least one cylindrical recess is formed. A first piston is mounted in a sealed and displaceable manner in the recess. The first piston is formed with a cylindrical recess. A second piston is movable in the cylindrical recess of the first piston. A valve seat is formed on the first piston, against which the second piston with a sealing surface can be pressed in such a way that the second piston can be displaced in the first piston between a position which opens a flow passage through the first piston and a position which shuts off a flow passage through the first piston. The first piston thus acts as a metering piston, through whose displacement a defined quantity of fluid, in particular, a lubricant, can be fed or metered. The second piston, in contrast, acts together with other components, for example, a spring or the like, as a reversing piston, which can change the pressure acting on the first piston through targeted opening and/or closing and thus can create a reversal of the direction of movement of the first piston. Because the two pistons are arranged one inside the other, it is possible to keep the dimensions of the piston arrangement according to the invention especially compact. Furthermore, this simple assembly of the piston arrangement keeps the amount of maintenance low and the reliability of the piston arrangement high.

Advantageously, an elastic element, in particular, a platespring package or a compression spring, urges the second piston toward a position which opens a flow passage through the first piston. Through the force of the spring, etc., initially a flow of fluid through the first piston is allowed, wherein the fluid flow can be shut off, for example, by a stop of the second piston on a stop surface and/or due to the fluid pressure.

A free-moving seal between the first and the second valve, which also achieves a good sealing effect, can be realized such that the valve seat and the sealing surface have a conical shape. In addition, the seal can be improved in such a way that the valve seat and/or the sealing surface is provided with a sealing element, for example, a sealing ring.

The second piston has a cylindrical outer surface, whose diameter approximately corresponds to the inner diameter of the cylindrical hollow space of the first piston. One or more helical or curved grooves can be provided on the outer surface of the second piston, so that a fluid can flow in these grooves between the first and second pistons.

According to a preferred embodiment of the invention, the piston arrangement is a component of a metering valve in which the first piston acts as an injector piston and defines two chambers which can be brought into flow connection with each other or sealed against each other by displacement of the second piston. The combined surface areas of the first and second piston facing the first chamber are smaller than the surface area of the first piston (and, if applicable, elements connected to this piston) facing the second chamber. Through this surface area difference, it is possible to control the movement of the piston arrangement, in that fluid initially flows through the piston arrangement, so that the pistons are then moved opposite the flow direction of the fluid due to the larger effective surface area in the second chamber. In contrast, if the second piston seals off the flow through the first piston, then the pistons are moved in the opposite direction, i.e., in the flow direction of the fluid. The change-over between the individual metering phases is thus realized by the movement of the two pistons. Due to the second piston, which is integrated in the injector piston and which acts as a control valve, and due to the surface area difference of the injector piston, it is possible to form the entire metering valve very compactly.

For a metering valve (injector) according to the invention, the housing advantageously forms an injector body which can be connected to a manifold and which has a first opening for connecting the first chamber to a supply line in the manifold and an outlet opening that can be closed, in particular, by means of a relief valve and that is connected, in turn, to a connection provided in the manifold. If several metering valves are provided on such a manifold, the outlets of each injector are located on the manifold. If repair to or the replacement of an injector should be necessary, then only the attachment screws, etc., of the given injector need be loosened and removed. The solid piping on the manifold and also the manifold itself here remain mounted, so that the system is very maintenance-friendly. Manifolds can also be realized, on which several injectors are located. Here, only the dimensions of the manifold and the number of connection boreholes are different. Unused injector sites can be closed, for example, with blind plugs.

An injector closure screw is threaded into the housing on the side of the second chamber. Further, an adjustment element is threaded in the injector closure screw. Optionally, an indicator pin connected to the first piston is guided in a movable way by the adjustment element. The stroke of the injector piston and thus, for example, the metered quantity of grease, is limited by a stop on the injector closure screw. For example, if a smaller grease amount is needed, then a threaded pin in the adjustment element can be continuously adjusted, so that the aforesaid indicator pin connected to the first piston stops mechanically and thus limits the piston stroke. It is theoretically also possible to adjust the zero feed point for the metering valve according to the invention.

It is preferred that the second chamber be connected to the surroundings of the housing via an opening that can be sealed by means of a closure screw. Through such lateral openings, for example, several injectors can be connected one under the other, by means of which the output quantity per stroke and lubricating position can be increased, without using injectors with greater maximum output quantity.

The two chambers are desirably sealed against each other, wherein the resulting intermediate space is pressurized by a pressure-relief line with lower pressure than the pressure in the main line. This can be realized in that the first and the second chambers are sealed against each other by means of the first piston, wherein, in this sealing region of the first piston, an opening is provided in the housing, which is in flow connection with the outlet opening or with the surroundings of the housing.

According to another preferred embodiment of the invention, the piston arrangement is a component of a flow-rate sensor for connection in a fluid line. In this embodiment, the housing has an inlet opening and an outlet opening between which the first piston is arranged. A first chamber is provided between the inlet opening and the first piston, and a second chamber is formed between the outlet opening and the first piston. The chambers are in flow communication with each other or separated from each other as a function of the position of the second piston. The second piston, which acts as a control valve, and the first piston, which acts as a sensor piston, can be set in an oscillating motion together with a compression spring for pressurizing the inlet opening. This motion can be detected by means of a sensor and can be transmitted to a controller and evaluated. The flow-rate sensor according to this embodiment is shaped in an especially space-saving and reliable way.

In one embodiment of a flow-rate sensor, preferably a first compression spring supported on the first piston (or a component connected to this piston) urges the second piston toward an open position connecting the two chambers. Together with the fluid force, this spring force simplifies the opening of the passage between the first piston and the second piston. In this same embodiment, a second compression spring between the outlet opening and the first piston urges the first piston in the direction toward the inlet opening. This second compression spring is designed in such a way that the first piston can move in the direction toward the outlet opening against the force of the second compression spring due to the fluid pressure when the second piston is in its closed position. If the second piston then abuts against a corresponding surface of the outlet opening with a stop, then the second piston is also opened by the force of the first compression spring acting on this piston, so that fluid can flow from the inlet opening through the piston arrangement to the outlet opening. In this state, the second compression spring presses the first piston back in the direction toward the inlet opening, wherein the passage opening in the piston arrangement closes again. Thus a detectable oscillating movement of the piston arrangement is produced.

The measurement of the flow rate therefore can be realized by using a simple mechanism, such as a magnet or the like (e.g., a ring magnet) in or on the first piston and a sensor (e.g., a Hall sensor) for detecting the position and/or the movement of the magnet or the like. In this way, it is possible to detect whether fluid is flowing through the flow-rate sensor. For a known volume flowing through the flow-rate sensor for a stroke of the piston arrangement according to the invention, the flow rate can also be determined. The Hall sensor, etc., can be provided on a circuit board, which also carries function LEDs and connection cables. Advantageously, the circuit board is encapsulated and fixed on the housing of the flow-rate sensor.

According to another embodiment of the invention, the piston arrangement is a component of a hydraulic motor. In this embodiment, the first piston can be formed, as for a metering valve (injector), as a differential piston with a surface area difference and extended outwardly. In addition, it is possible to form the piston as for a flow-rate sensor with a restoring spring, but without a magnet. With this outward extension, for example, a pump element or the like can be controlled.

Other goals, features, advantages, and possible applications of the invention emerge from the embodiments described above and the drawing. Here, all of the described and/or graphically illustrated features themselves or in any combination form the subject matter of the invention, independently of their summary in the claims or references to them.

List Of Reference Symbols
1 Adjustment element (adjustment screw)
2 Indicator pin
3 Injector closure screw
4 Housing (injector body)
5 Injector piston screws
6 Helical compression spring
7 Second piston (control valve)
8 First piston (injector piston)
9 Manifold
10 Cylinder head screw
11 Closure screw
12 Threaded connection
13, 13' Relief valve
14 First chamber
15 Second chamber
16 Supply line
17 Outlet borehole
18 Valve seat
19 Sealing surface
20 Flow-rate sensor
21a Inlet opening
21b Outlet opening
22 Sensor housing
23 First piston (sensor piston)
24 Second piston (sensor control valve)
25 Conical compression spring
26 Ring magnet
27 Compression spring
28 Hall sensor
29 Sealing part
30 Support disk
31 Compression spring
32 Clamping sleeve

What is claimed is:

1. A piston arrangement for metering valves, flow-rate sensors, or hydraulic motors, said piston arrangement comprising:
a housing;
at least one recess in the housing;
a first piston sealed and movable in the at least one recess of the housing;
a recess in the first piston;
a flow passage through the first piston;
a second piston movable in the recess of the first piston;
a sealing surface on the second piston; and
a valve seat on the first piston against which the sealing surface on the second piston is selectively pressed in such a way that the second piston is movable relative to the first piston between a position which opens said flow passage through the first piston and a position which shuts off said flow passage through the first piston;
the housing forming an injector body which is adapted to be connected to a manifold, said injector body having a first opening for connecting a first chamber to a supply line in the manifold and an outlet opening which is adapted to be closed by a relief valve and which is connected, in turn, to a connection provided in the manifold.

2. A piston arrangement according to claim 1, further comprising an elastic element urging the second piston toward a position which opens said flow passage through the first piston.

3. A piston arrangement according to claim 1, characterized in that the valve seat and the sealing surface have a conical shape.

4. A piston arrangement according to claim 1, characterized in that the second piston has, at least in some regions, an outer surface whose diameter corresponds approximately to the inner diameter of the recess in the first piston and on which at least one helical groove is provided.

5. A metering valve with a piston arrangement according to claim 1, characterized in that the first piston defines in the housing said first chamber and a second chamber which is adapted to be brought into flow connection with each other through movement of the second piston, and wherein the combined surface areas of the first and second pistons facing the first chamber are smaller than the surface area of the first piston, and any elements connected to the first piston, facing the second chamber.

6. A metering valve according to claim 5, further comprising an injector closure screw screwed into the housing on the side of the second chamber, an adjustment screw screwed into the closure screw, and an indicator pin connected to the first piston and guided by said adjustment screw.

7. A metering valve according to one of claim 5, characterized in that the second chamber communicates with surroundings of the housing by means of an opening, and a closure screw for sealing the opening.

8. A metering valve according to claim 5, characterized in that the first and the second chambers are sealed relative to each other by means of the first piston and that, in the sealing region of the first piston, there is an opening in the housing which is in flow connection with the outlet opening or with the surroundings of the housing.

9. A hydraulic motor with a piston arrangement according to claim 1.

10. A piston arrangement for metering valves, flow-rate sensors, or hydraulic motors, said piston arrangement comprising:
- a housing;
- at least one recess in the housing;
- a first piston sealed and movable in the at least one recess of the housing;
- a recess in the first piston;
- a flow passage through the first piston;
- a second piston movable in the recess of the first piston;
- a sealing surface on the second piston; and
- a valve seat on the first piston against which the sealing surface on the second piston is selectively pressed in such a way that the second piston is movable relative to the first piston between a position which opens said flow passage through the first piston and a position which shuts off said flow passage through the first piston;
- the second piston having, at least in some regions, an outer surface whose diameter corresponds approximately to the inner diameter of the recess in the first piston and on which at least one helical groove is provided.

11. A flow-rate sensor with a piston arrangement according to claim 10, characterized in that the housing has an inlet opening and an outlet opening between which the first piston is arranged, and wherein a first chamber is formed between the inlet opening and the first piston and a second chamber is formed between the outlet opening and the first piston, the first and second chambers being either connected to each other or separated from each other as a function of the position of the second piston in the first piston.

12. A flow-rate sensor according to claim 11, further comprising a first compression spring on the first piston or a component connected to the first piston for urging the second piston toward a position connecting the two chambers.

13. A flow-rate sensor according to claim 12, further comprising a second compression spring between the outlet opening and the first piston for urging the first piston in a direction toward the inlet opening.

14. A flow-rate sensor according to claim 11, further comprising a magnet on or in the first piston, and a sensor on or in the housing for detecting the position and/or movement of the magnet.

15. A hydraulic motor with a flow-rate sensor and piston arrangement according to claim 11.

16. A piston arrangement for metering valves, flow-rate sensors, or hydraulic motors, said piston arrangement comprising:
- a housing;
- at least one recess in the housing;
- a first piston sealed and movable in the at least one recess of the housing;
- a recess in the first piston;
- a flow passage through the first piston;
- a second piston movable in the recess of the first piston;
- a sealing surface on the second piston;
- a valve seat on the first piston against which the sealing surface on the second piston is selectively pressed in such a way that the second piston is movable relative to the first piston between a position which opens said flow passage through the first piston and a position which shuts off said flow passage through the first piston, the first piston defining in the housing first and second chambers which can be brought into flow connection with each other through movement of the second piston; and
- an injector closure screw screwed into the housing on the side of the second chamber, an adjustment screw screwed into the closure screw, and an indicator pin connected to the first piston and guided by said adjustment screw.

* * * * *